April 6, 1948.　　　　G. W. SAMMONS　　　　2,439,025
SLIDE RULE
Filed March 28, 1944　　　　4 Sheets-Sheet 2
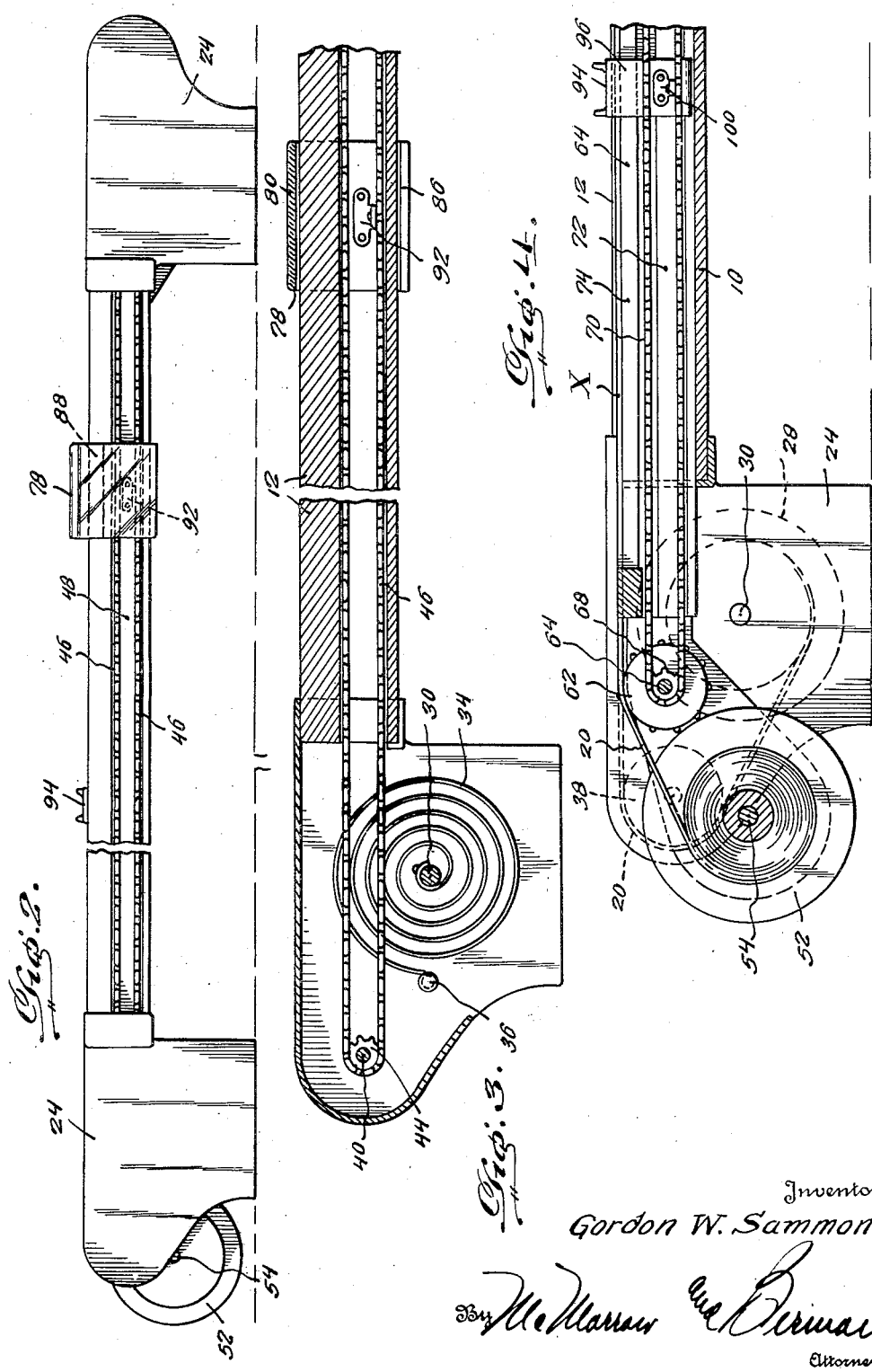
Inventor
Gordon W. Sammons.
Attorneys April 6, 1948.　　　G. W. SAMMONS　　　2,439,025
SLIDE RULE
Filed March 28, 1944　　　4 Sheets-Sheet 3

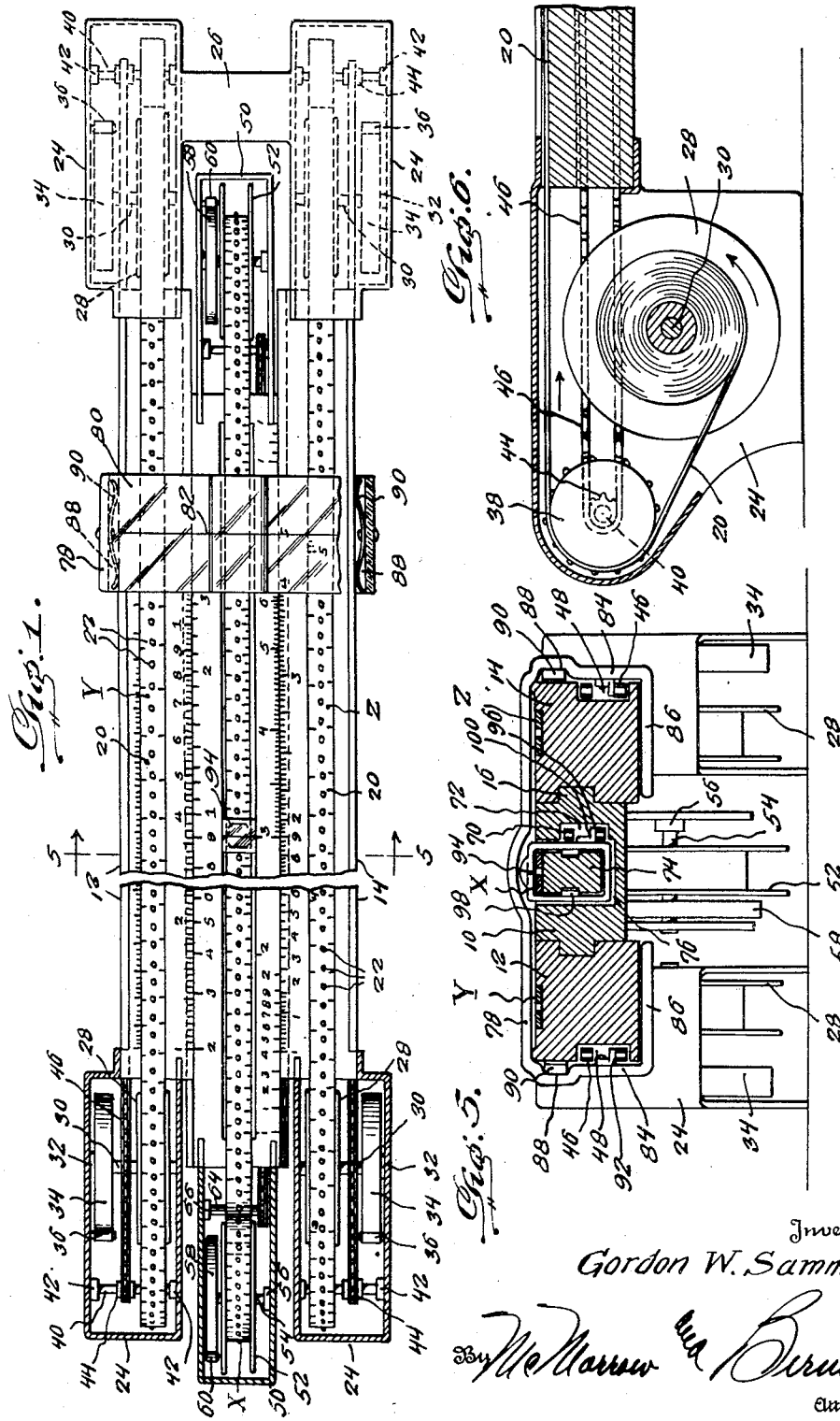

Inventor
Gordon W. Sammons,

By McNarrow and Berman
Attorneys

April 6, 1948. G. W. SAMMONS 2,439,025
SLIDE RULE
Filed March 28, 1944 4 Sheets-Sheet 4

Inventor
Gordon W. Sammons,
Attorneys

Patented Apr. 6, 1948

2,439,025

UNITED STATES PATENT OFFICE 2,439,025

SLIDE RULE

Gordon W. Sammons, Hagerstown, Md.

Application March 28, 1944, Serial No. 528,450

6 Claims. (Cl. 235—71)

This invention appertains to improvements in slide rules and has for one of its several objects and advantages to so modify and refine the present slide rule structure that its reading range will be increased many times beyond that afforded by the graduated scales on the standard slide rule which, in a well constructed slide rule, allows readings only to within one-tenth of one per cent accuracy for more than two figures, on the average, and this degree of accuracy is only obtainable when extreme care is exercised in the use of the rule.

In multiplying or dividing a column of figures by a constant or other figure with a slide rule, and particularly where dollars and cents are included, it is difficult to carry the result out beyond three or four figures. With this thought in mind the improved slide rule of this application contemplates adding traveling tapes with enlarged graduations thereon corresponding with graduations on the slide rule to the face of the usual slide rule, or incorporated in longitudinal recesses therein, and providing actuating means associated with an indicator on the slide rule for operating the tapes at a speed greater than that which the indicator is moving, whereas, as an illustration, ten divisions on the tape will pass as the line on the indicator passes one division of the scale on the face of the rule, and travel of the indicator and tapes is synchronized to correspond therewith.

Another object of the invention is to provide a slide rule with slidable tapes, upon which the scale graduations are spread apart to facilitate easier and infinitely more exact readings, the tapes being synchronized, one with respect to the other, and have their ends wound upon reels mounted on the opposite ends of the body and slide bar of the rule, the reels having operative connections with the cursor for moving the tapes correspondingly with the latter but in opposite directions thereto; the width of spread of the scale graduations being determined by the respective lengths of tapes employed.

A further object of the invention has to do with the provision of a slide rule as above characterized, wherein the operative connections between the cursor and the reels are preferably in the form of chain and sprocket systems, the sprockets of each system being interconnected in pairs and having a tape trained over one sprocket of each pair for guided movement of its intermediate portion parallel to the scaled faces of the rule body or the slide bar and an endless chain connecting the companion sprockets, the chains being operatively connected to the cursor to transmit its directional movements along the rule body to the tapes through the other sprockets, the ratio of tape travel speed, relatively to that of the cursor, being determined by a predetermined sprocket ratio.

With these and other objects and advantages of equal importance in view, the invention resides in the certain new and useful combination, construction, and arrangement of parts, as will be hereinafter more fully described, set forth in the appended claims, and illustrated in the accompanying drawings, in which:

Figure 1 is a top plan view, partly in section, of the improved slide rule, in accordance with the invention;

Figure 2 is a side elevation;

Figure 3 is an enlarged, fragmentary, vertical and longitudinal section, showing one of the tape rewinding springs;

Figure 4 is a view similar to that of Figure 3, but showing the tape and its operative mechanism that is mounted on the slide bar of the rule;

Figure 5 is an enlarged vertical, transverse section, taken through the line 5—5 of Figure 1;

Figure 6 is a view similar to those of Figures 3 and 4, but showing one of the reels and its associated chain and sprocket system that is mounted on the body of the rule to one side of the slide bar;

Figure 7:
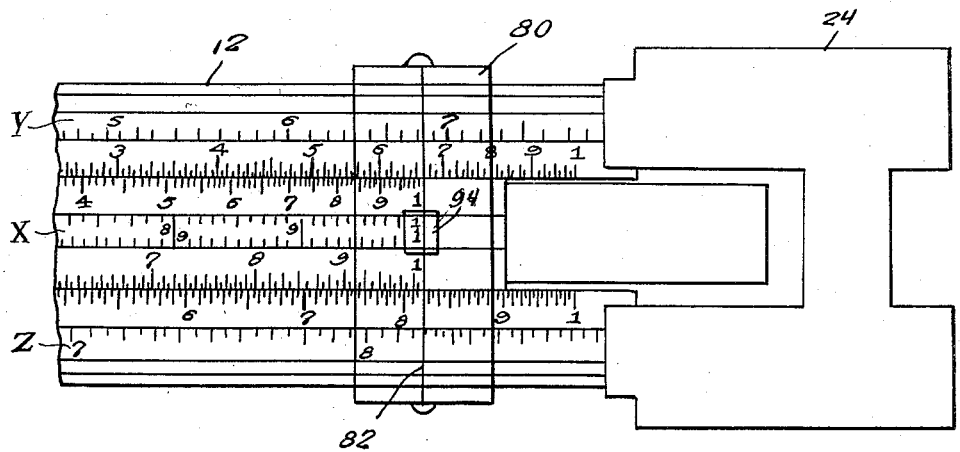
Figure 8:
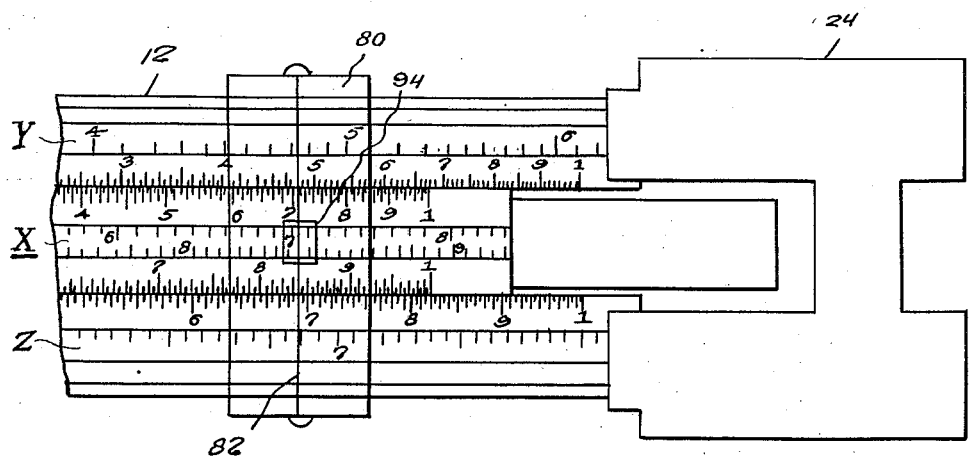
Figure 9:
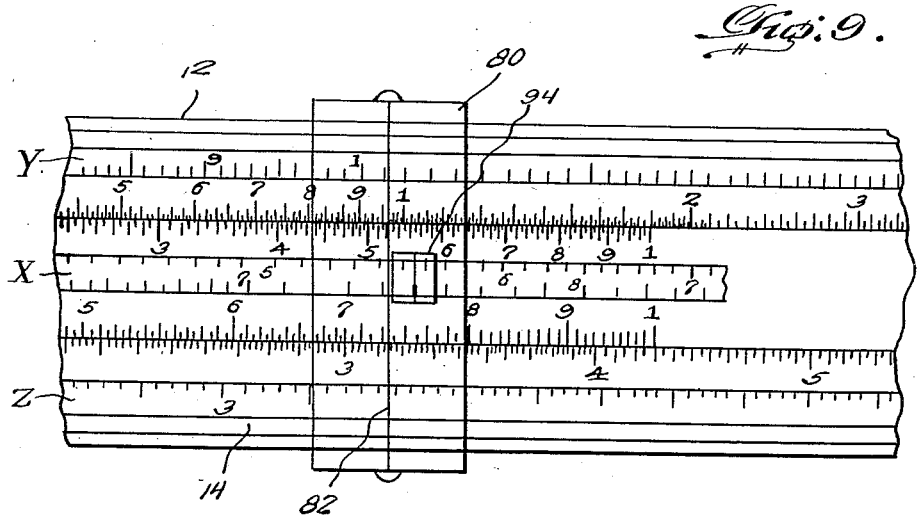
Figure 10:
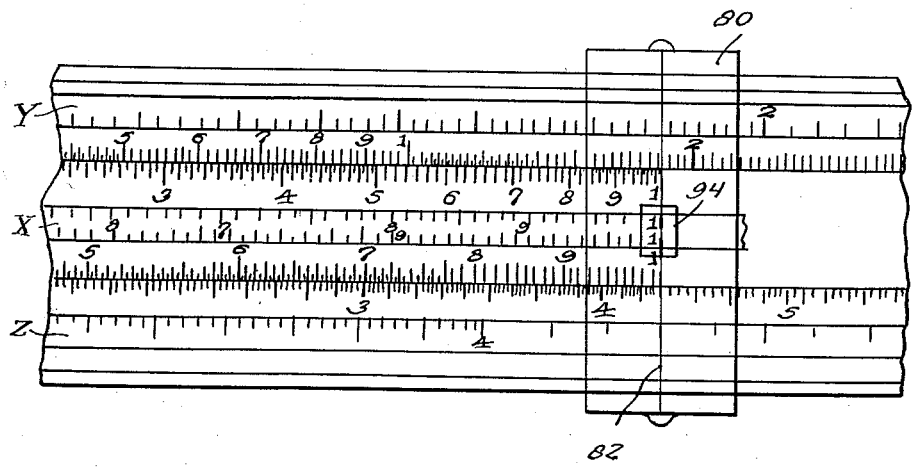

Figures 7 and 8 are face views of a fragment of the slide rule, showing the relation of the parts for the solving of a problem in multiplication; and Figures 9 and 10 are views similar to those of Figures 7 and 8, but showing the position of the parts for the solving of a problem in division.

Referring to the drawings, wherein like characters of reference denote corresponding parts in the several views, the embodiment of the invention, as it is exemplified therein, is comprised in an elongated body made up of three parallel sections or bars, an inner section or bar 10 and outer sections or bars 12 and 14, and, as shown in Figure 5, the bars 12, 14, have their inner side faces longitudinally grooved to receive tongues 16 formed longitudinally of the opposite side faces of the bar 10, for sliding movements of the latter relatively thereto, after the manner of the slide bar of a standard slide rule. The top faces of the several bars are each longitudinally channeled, as at 18, to support a movable tape 20, the tapes on the bars 10, 12, and 14, being designated X, Y, and Z, respectively. The face portions of the upper, or outer, bar 12, at the opposite sides of the tape Y, are provided with graduated scales designated L and A, and the adjacent edges of that tape having graduated scales correspondingly designated. Similarly, the face portions of the intermediate slide bar 10, at the opposite sides of the tape X, are provided with graduated scales designated B and C, and the adjacent edges of the tape with graduated scales of the same designation. Likewise, the lower or inner bar 14 has its face portions, at opposite sides of the tape Z, provided with graduated scales designated D and K, with the adjacent side edges of the tape having complemental graduated scales similarly designated.

Mounted on the ends of the bars 12 and 14 are identical hollow casings 24 in each of which a reel 28 is keyed on a transversely disposed shaft 30, journaled at its ends in bearings 32 carried on the side walls of the casing, for the winding thereon of a complemental end of a respective one of the tapes Y, Z. A coiled spring 34 is located at one side of the reel 28, with its inner end secured to the shaft 30 and its outer end, as at 36, to a side wall of the casing. Positioned outwardly from and above the reel 28 is a sprocket element 38 which is keyed on another transversely disposed shaft 40 that has its ends journaled in bearings 42, also carried on the side walls of the casing. The tape 20, in passing from the reel 28 to a channel 18, is trained about this sprocket element 38 and is formed with a line of perforations 22 which are engaged by the sprocket teeth to guide the tape accurately in line with its channel. Keyed on the shaft 40, alongside the sprocket element 38, is a drive sprocket 44, preferably smaller than the sprocket element and of a size necessary to provide a predetermined tape speed, which is interconnected by an endless chain 46 with a like sprocket within the casing 24 at the opposite end of a respective one of the bars 12, 14, the chain 46 being housed within a channel 48, between the oppositely disposed casings, extending longitudinally of the outer side face of each of the bars 12, 14. The casings 24 at the opposite ends of the bars 12, 14, are rigidly connected together by a cross bar 26, thus providing a unitary body structure that compares favorably with the body of a standard slide rule.

Mounted likewise on each end of the slide bar 10, is a hollow casing 50, in which a reel 52 is partially housed and is keyed on a tranverse shaft 54, that has its ends journaled in bearings carried on the side walls of the casing. A coiled spring 58 encircles the shaft 54, with its inner end secured to the shaft and its outer end, as at 60, to the adjacent casing wall. A guide sprocket 62 is keyed on a second transverse shaft 64, that has its ends journaled in bearings 66, also carried on the side walls of the casing. This sprocket 62 is located inwardly from the reel 52, with its uppermost surface lying substantially in the plane of the top surface of the slide bar 10. The tape X extends between the oppositely disposed casings 50, with each of its ends trained over a sprocket 62 and wound upon a reel 52, while its intermediate portion is slidably supported upon the top surface of an elongated bar 74, that is secured within a slotway 76 formed along the longitudinal center of the slide bar 10, the guide bar being spaced from the side and bottom walls of the slotway 76 and having its top surface lying below the plane of the like surface of the slide bar, so that the upper face of the tape is flush with the latter surface. Keyed on the shaft 64, alongside the sprocket 62, is another but smaller sprocket 68, which is connected by a chain 70 with a like sprocket 68 in the casing 50 at the opposite end of the slide bar 10, the chain 70 extending between the companion sprockets 62 through a channel 72, formed in a side wall of the slotway 76.

Slidably mounted on the bars 12 and 14, and overlying the top side of the rule, is a cursor or indicator, which is comprised in a frame 78 to receive a transparent sight window 80, through which readings are to be had from the graduated scales on the top surfaces of the several bars and the tapes 20, a hairline 82 being provided on the transparency for cooperation with the scale graduations in a usual manner. The frame 78 has downwardly angled end portions 84 at the outer sides of the bars 12, 14, and angled portions 86 inturned from the lower ends of the portions 84 engaged beneath the bars. Formed crosswise of each of the angled portions 84 is a groove 88 to seat a bowed spring therein for sliding frictional bearing on the opposed face of a bar 12, 14, the frictional effect being sufficient to effectively oppose the tape winding tendencies of the coiled springs 34, but otherwise allow for a proper manipulation of the cursor to a set position. Secured on the inner side of each of the angled portions 84, below the groove 88 therein, is a clip 92, which is engaged with a link of the lower run of a chain 46, so that, upon movement of the cursor 78 in either direction along the rule body, the tapes Y, Z, will have relative movement in the reverse direction.

Similarly mounted on the guide bar 74, is a second cursor, or indicator, 94, that is provided with a hairlined transparency in its upper side and has its opposite, downwardly angled, end portions 96 provided with bowed springs 98, secured on their inner sides and slidable in grooves formed longitudinally in the opposed sides of the guide bar. Secured on the outer side of one of the portions 96, is a clip 100 which is engaged with the lower run of the chain 70.

In the use of the rule as thus provided, it will be readily apparent that manual operation of the cursor 78, for instance, toward the left hand end of the rule body, the tapes Y, Z, will be caused to travel toward the right hand end thereof by the pull of the lower runs of the chains 46 acting simultaneously to impart rotary motion to the respective one of the sprockets 38, 44, and, conversely, upon movement of the cursor toward the right, the tapes Y, Z, will be caused to travel to the left. Also, it will be obvious that the interval spacing of the scale graduations on the tapes 20 will depend upon the ratio between the sprockets 38, 44, or 62, 68. Thus, by selecting a proper sprocket ratio, the interval spacing of the scale graduations on the tapes 20 can be increased enormously for more accurate setting and for easier reading. Movement of the second cursor 94, on the guide bar 74, effects a similar travel of the tape X, by the pull of the chain 70, acting on the sprockets 62, 64. The springs 34, 58, exert a sufficient tension on the tapes 20, through the sprockets 38, 62, to maintain the same taut in their lie and travel in the channels 18.

For the purpose of demonstrating the functions of the rule in the solving of a problem in multiplication, reference is had to Figures 7 and 8 of the drawings, wherein, to solve the problem, for instance, 82 multiplied by 84, the cursor 80 is moved to the right or left, depending upon its original position on the rule body, until the hairline 82 exactly coincides with the figure 82 on tape Z. Next, the cursor 94, on the intermediate slide bar 10, is moved to coincide with the figure 1, or final graduation on the extreme right hand end of the tape X, and thereafter, the slide bar 10 is moved relatively to the rule body until the hairline of the cursor 94 exactly coincides with the hairline 82 of the cursor 80. Now, since there is no immediate need for the cursor 80, it can be moved out of the way while the cursor 94 is moved to the left and until its hairline and the graduation 84 on the tape X exactly coincide. Finally, the cursor 80 is moved to position to have its hairline 82 coincide with the hairline of the cursor 94, when the answer is to be read under the hairline 82, of the cursor 80, on the tape Z, which reading is made easy by enlarging through the magnifying power of the cursor.

To demonstrate the functions of the slide rule in the solving of a problem in division, reference is made to Figures 9 and 10. Here, with the problem 3225 divided by 75, for instance, the first step is to move the cursor 80 to position its hairline 82 to coincide with the graduation that is indicative of 3225 on the tape Z. Next, the cursor 94 is moved to position its hairline over the graduation 75 on tape X, and thereafter, the intermediate slide bar 10 is moved, relatively to the rule body, either to the right or left depending upon its former position, until the hairlines of the two cursors match. This function is demonstrated in Figure 9. For the next series of steps, demonstrated in Figure 10, the cursor is moved to one side or the other of the cursor 94 and the latter then moved to the right until its hairline exactly coincides with the 1 graduation at the extreme right end of the tape X. Following this, the cursor 80 is moved to have its hairline 82 match the hairline of the cursor 94, when the answer 43 is read directly under the hairline 82, of the cursor 80, on tape Z.

To illustrate the fact that the tapes X, Y, and Z, are perfectly synchronized, another problem may be worked while the tape Z is at its last position. Assuming that the square of 43 is desired, by reading the graduation under the hairline 82, of the cursor 80, the answer 1849 will be observed on tape Y. Of course, any problem involving the extraction of square root will be the same in a reversed procedure, in which case, the hairline 82, of the cursor 80, would be set on the required graduation on tape Y and its square root read on tape Z. It is to be here noted, that in making these last calculations, the use of the intermediate slide bar 10, or of the tape X, is not involved.

Without further description, it is thought that the many advantages of the exampled slide rule will be obvious to those having skill in the use of calculators of this type, and, in this connection, it is to be pointed out that the range of the rule may be appreciably enlarged by the addition of movable tapes and scales of graduations, other than those described and illustrated herein. Also, the moving parts of the improved rule are readily adaptable for either electrical or mechanical operation, if that be found desirable.

Having thus fully described my invention, it is to be understood that various changes in design and minor details of construction and arrangement of parts, as well as a substitution of equivalents, to which the improved slide rule is susceptible, may be resorted to, without departing from the spirit of the invention, or its scope as claimed.

What I claim is:

1. In combination with a slide rule having the usual slider and indicator with registering graduations providing scales on the slider and face of the rule; a tape longitudinally slidable on the face of the rule, said tape having graduations thereon corresponding with divisions of the slide rule, and means associated with the indicator for moving said tape wherein a plurality of divisions on the tape pass a line on the indicator as the line passes one division on the rule.

2. In combination with a slide rule having the usual slider and indicator with registering graduations providing scales on the slider and face of the rule; a tape longitudinally slidable on the face of the rule, said tape having graduations thereon corresponding with divisions of the slide rule, said divisions of the tape being in multiple of the divisions of the rule, and means associated with the indicator for moving said tape wherein a plurality of divisions on the tape pass a line on the indicator as the line passes one division on the rule.

3. In combination with a slide rule having the usual slider and indicator with registering graduations providing scales on the slider and face of the rule; a tape longitudinally slidable on the face of the rule, said tape having graduations thereon corresponding with divisions of the slide rule, and means associated with the indicator for moving said tape in a direction opposite to that in which the indicator is moving wherein a plurality of divisions on the tape pass a line on the indicator as the indicator passes one division on the rule.

4. In combination with a slide rule having the usual slider and indicator with registering graduations providing scales on the slider and face of the rule; a plurality of tapes longitudinally slidable on the face of the rule, said tapes having graduations thereon corresponding with divisions in multiple of the divisions of the slide rule, and means associated with the indicator for moving said tapes in directions opposite to that in which the indicator is moving wherein a plurality of divisions on the tapes pass a line on the indicator as the line passes one division on the rule.

5. In combination with a slide rule having the usual slider and indicator with registering graduations providing scales on the slider and face of the rule; tapes longitudinally slidable on the face of the rule, and a tape longitudinally slidable on the face of the slider, said tapes having graduations thereon corresponding with divisions of the slide rule, an auxiliary indicator on the slider, said tapes having graduations thereon corresponding with divisions of the slide rule, and means associated with the indicator for moving said tapes wherein a plurality of divisions on the tapes pass a line on an indicator as the line passes one division on the rule or slider.

6. In combination with a slide rule having the usual slider and indicator with registering graduations providing scales on the slider and face of the rule; tapes longitudinally slidable in recesses in the face of the rule, said tapes having graduations thereon corresponding with divisions in multiple of the divisions of the slide rule, endless chains associated with the sides of the slide rule, means connecting the indicator to the chains, wheels associated with the chains and tapes adapted for operation by the chains, resilient means holding the tapes in tension, and means reversing the direction of travel of the tapes as compared with that of the indicator, said instrumentalities operating the tapes at a speed greater than that of the movement of the indicator wherein a plurality of divisions on the tapes pass a line on the indicator as the said line passes one division on the rule.

GORDON W. SAMMONS.

REFERENCES CITED

The following references are of record in the file of this patent:

UNITED STATES PATENTS

| Number | Name | Date |
|---|---|---|
| 786,102 | Cooper | Mar. 28, 1905 |
| 1,605,922 | Cook | Nov. 9, 1926 |
| 1,777,692 | Fuss | Oct. 7, 1930 |